United States Patent [19]

Shibata et al.

[11] Patent Number: 4,717,925
[45] Date of Patent: Jan. 5, 1988

[54] OPTICAL SCANNER WITHOUT EXTRA CONVERGENT LENS

[75] Inventors: Isamu Shibata; Kazuyuki Shimada, both of Tokyo, Japan

[73] Assignee: Ricoh Company, Ltd., Tokyo, Japan

[21] Appl. No.: 848,466

[22] Filed: Apr. 7, 1986

[30] Foreign Application Priority Data

Apr. 19, 1985 [JP] Japan .................................. 60-84799

[51] Int. Cl.⁴ ...................... G01D 9/42; G01D 15/14; H04H 1/21
[52] U.S. Cl. .................................. 346/108; 346/160; 358/296
[58] Field of Search ................. 346/108, 107 R, 76 L, 346/160; 358/296

[56] References Cited

U.S. PATENT DOCUMENTS

| 4,251,825 | 2/1981 | Mikami | 346/160 |
| 4,443,695 | 4/1984 | Kitamura | 346/160 |
| 4,613,877 | 9/1986 | Spencer | 346/160 |

Primary Examiner—E. A. Goldberg
Assistant Examiner—Mark Reinhart
Attorney, Agent, or Firm—Oblon, Fisher, Spivak, McClelland, & Maier

[57] ABSTRACT

An optical scanner for use with a laser printer, a laser display or the like includes an optical deflector for directly scanning a photoconductive drum with a beam which is emitted from a semiconductor laser and to be focused as a minute spot on the drum. The frequency of an image scanning clock is continuously varied as an approximation to scanning speeds of a spot which is produced by the deflector. The intensity of the beam is controlled by an intensity control circuit.

6 Claims, 6 Drawing Figures

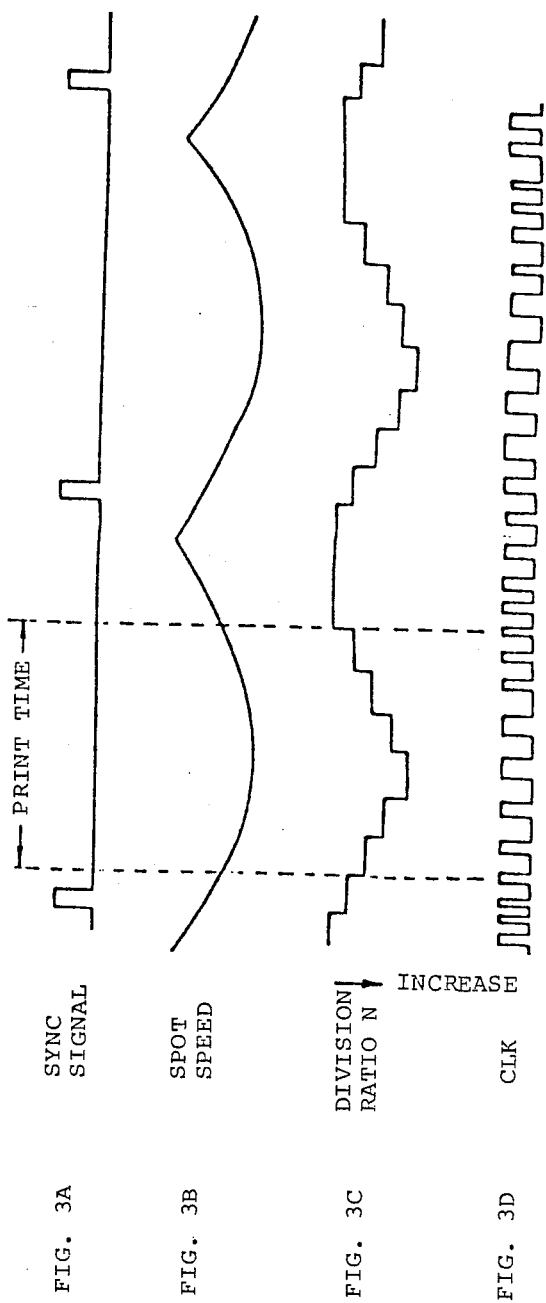

OPTICAL SCANNER WITHOUT EXTRA CONVERGENT LENS

BACKGROUND OF THE INVENTION

The present invention relates to an optical scanner for use with a laser printer, a laser display and others.

Optical scanners may generally be classified into two different types, i.e., a pre-objective type and a post-objective type. Generally, in a pre-objective type scanner a light beam issuing from a light source is deflected at a constant angular velocity by an optical deflector which is implemented with a polygon mirror, the deflected beam scanning a photoconductive element or like object through an $f\theta$ lens at a constant scanning speed. In a post-objective type scanner, on the other hand, a plurality of clocks are seletected one after another to stepwisely change the frequency of a picture scanning clock, thereby eliminating the need for an $f\theta$ lens. An example of such post-objective type scanners is disclosed in, for example, Japanese Unexamined Patent Publication (Kokai) No. 58-87965. In this instance, a light source is modulated by a data signal which is delivered responsive to the image scanning clock.

The problem with the ordinary pre-objective type scanner is that it is very expensive due to the use of an $f\theta$ lens. The post-objective type scanner which is constructed to compensate for scanning distortion by stepwisely varying the image scanning clock is disadvantageous in that the frequency variation of the clock is distcontinuous and, therefore, the scanning accuracy is limited. Assuming that the specific scanning distortion is 0.5 percent, for example, the accuracy at those points where the image scanning clock frequency is discontinuous cannot be controlled to the specific value without relying on a source clock which is 1/0.005=200 times higher than the image scanning clock frequency; where the image scanning clock frequency is 2 MHz, for example, the source clock frequency has to be 400 MHz which is impractically high.

SUMMARY OF THE INVENTION

It is therefore an object of the present invention to provide an inexpensive and accurate optical scanner.

It is another object of the present invention to provide a generally improved optical scanner.

An optical scanner of the present invention comprises a converging element for focusing a light beam issuing from a light source onto an object to be scanned as a minute spot, an optical deflecting element interposed between the converging element and the object for deflecting the light beam to scan the object, and a frequency varying circuit supplied with an information signal for generating an image scanning clock in order to transfer the information signal to the light source and continuously varying frequency of the image scanning clock in proportion to a scanning speed at which the deflecting element scans the object with a scanning spot, thereby compensating for scanning distortion.

In accordance with the present invention, an optical scanner for use with a laser printer, a laser display or the like includes an optical deflector for scanning a photoconductive drum with a beam which is emitted from a semiconductor laser and to be focused as a minute spot on the drum. The frequency of an image scanning clock is continuously varied as an approximation to scanning speeds of a spot which is produced by the deflector.

The above and other objects, features and advantages of the present invention will become more apparent from the following detailed description taken with the accompanying drawings.

BRIEF DESCRIPTION OF THE DRAWINGS

FIGS. 3A to 3D are timing charts demonstrating the operation of the optical scanner shown in FIG. 1.

DESCRIPTION OF THE PREFERRED EMBODIMENT

While the optical scanner of the present invention is susceptible of numerous physical embodiments, depending upon the environment and requirements of use, a substantial number of the herein shown and described embodiment have been made, tested and used, and all have performed in an eminently satisfactory manner.

Figure 1:
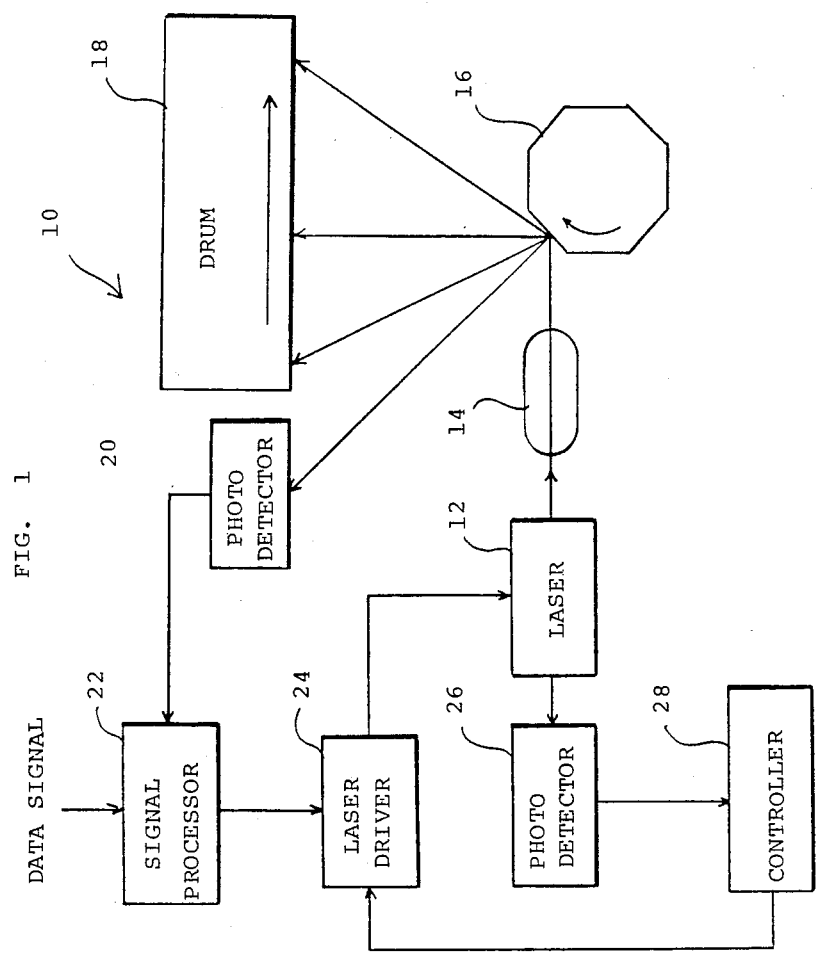
FIG. 1 shows a laser printer to which an optical scanner embodying the present invention is applied.

Referring to FIG. 1, a laser printer to which the present invention is applied is shown and generally designated by the reference numeral 10. A light beam issuing from a light source 12 is converged by a converging lens 14 and then deflected by an optical deflector 16. In this specific construction, the light source 12 comprises a semiconductor laser and the deflector 16, a polygon mirror. The laser beam deflected by the deflector 16 is focused as a minute spot on the uniformly charged surface of an object 18 which is to be scanned. In this particular embodiment, the object 18 comprises a photoconductive drum. The lens 14 mentioned above serves to focus the laser beam from the semiconductor laser 12 onto the photoconductive drum 18 as a minute spot. While the polygon mirror 16 is rotated to repeatedly move the spot as indicated by an arrow X, the drum 18 is also rotated.

A photodetector 20 is positioned outside of a data writing region in order to generate a synchronizing signal every time it senses the laser beam which has been deflected by the polygon mirror 16. The synchronizing signal is applied to a signal processing circuit, or signal processor, 22 which functions to deliver a data signal to a laser driver 24 timed to the synchronizing signal. The laser driver 24 drives the laser 12 responsive to the data signal from the signal processor 22 so that a light beam modulated by the data signal is focused onto the drum 18 to form an electrostatic latent image on the drum 18. The latent image is developed by a developing unit and then transferred to a paper or the like by a transferring unit, although not shown in FIG. 1. Meanwhile, a light beam issuing rearwardly from the laser 12 is incident to a photodetector 26. The photodetector 26 senses intensity of the incident beam to produce an output signal representative of the sensed intensity. A controller 28 controls the laser driver 24 responsive to the output signal of the photosensor 26, thereby controlling the output of the laser 12 to a predetermined value.

In such a laser printer 10, it has been customary to locate an $f\theta$ lens between the drum 18 and the deflector 16 so that the laser beam may scan the drum 18 at a constant speed. This particular embodiment of the present invention does not rely on such a lens. Specifically, in the illustrative embodiment, the frequency of an image scanning clock adapted to feed a data signal to the laser driver 24 is continuously variable in proportion to the scanning speed, or spot speed, of the laser beam which scans the drum 18, thereby compensating for scanning distortion.

Figure 2:
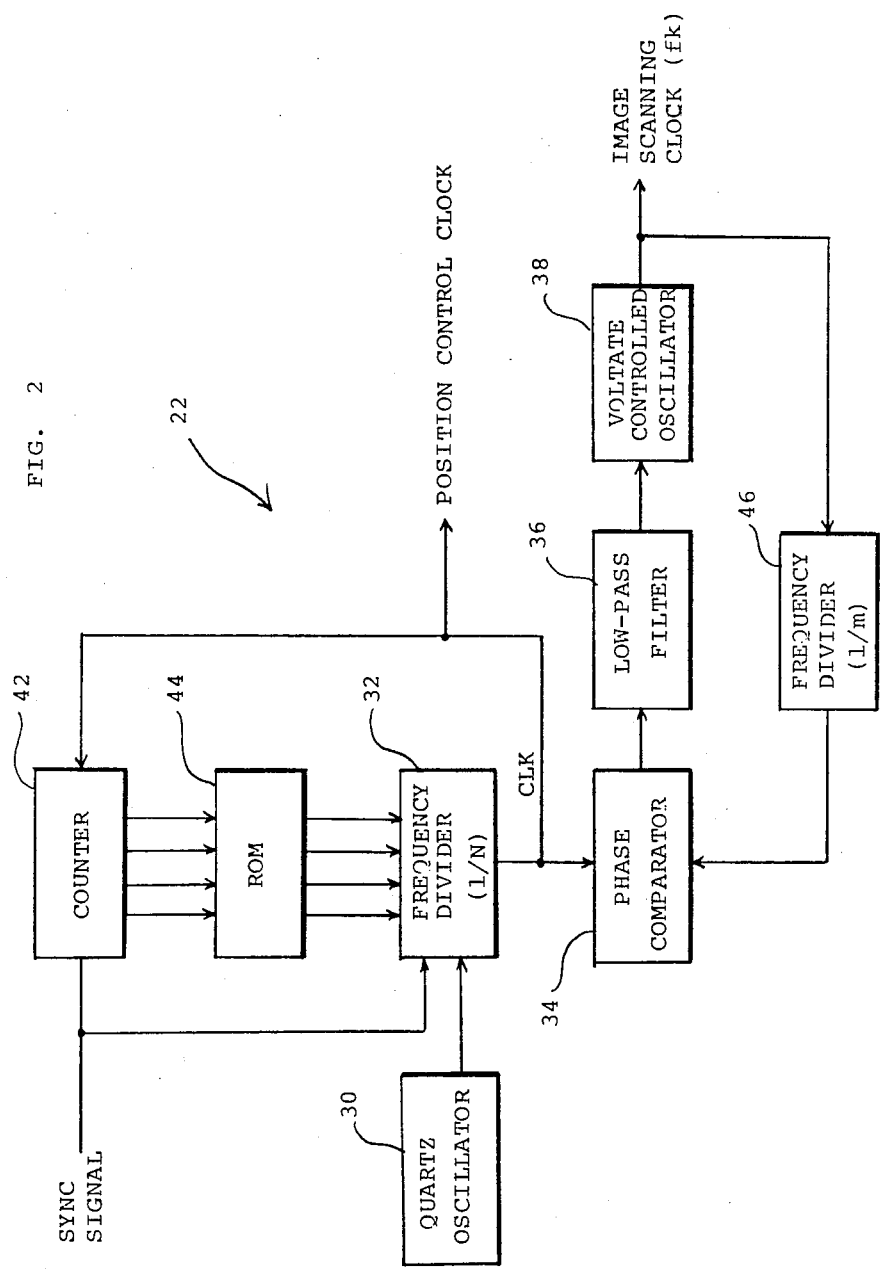
FIG. 2 is a block diagram showing details of a clock frequency varying section of the optical sensor shown in FIG. 1.

Referring to FIG. 2, there is shown in detail a clock frequency varying section which is included in the signal processor 22 of FIG. 1. A clock with a frequency f oscillated by a quartz oscillator 30 is divided by a frequency divider 32 to 1/N (N≧2). The output of the oscillator 30 which serves as a position control clock CLK is applied to a phase locked loop (PLL) which consists of a phase comparator 34, a low-pass filter 36, a voltage controlled oscillator 38, and a frequency divider 40. The PLL multiplies the clock CLK by m (m≧2) to produce an image scanning clock. The signal processor 22 with this specific construction controls the data writing position (data writing time period) using the position control clock CLK and, during that time period, applies data sequentially to the laser driver 24 responsive to the image scanning clock. The image scanning clock is divided by the frequency divider 40 to 1/m and then compared with the position control clock CLK by the phase comparator 34. The output voltage of the phase comparator 34, therefore, is representative of a phase difference between the two input clocks. This voltage is applied to the voltage controlled oscillator 38 via the low-pass filter 36 to control the oscillation frequency of the oscillator 38. Hence, the image scanning clock outputted by the oscillator 38 has a frequency fk that is expressed as $$fk = f \times 1/N \times m \qquad \text{Eq. (1)}$$

A counter 42 counts the position control clock CLK while delivering its output to a read only memory (ROM) 44 as an address signal. Addressed by the address signal, the ROM 44 applies data stored therein to the frequency divider 32 so as to vary the ratio assigned to the frequency divider 32.

Now, assume scanning distortion of the deflector 16 which is shown in FIG. 3B by way of example. Then, as shown in FIG. 3C, the ratio N assigned to the frequency divider 32 is varied by the output of the ROM 44 in proportion to the spot speed of the laser beam so as to compensate for the distortion. This means that the position control clock CLK outputted by the frequency divider 32 has undergone frequency modulation based on the ratio N and in proportion to the spot speed. The phase-modulated clock CLK is applied to the phase comparator 34. In this condition, although the image scanning clock is frequency-modulated according to the Eq. (1), its frequency is allowed to vary transitionally continuously, i.e., continuously with the spot speed by the low-pass filter 36, whereby the distortion is compensated for. The counter 42 is initialized by the synchronizing signal generated by the photodetector 20, so that the image scanning clock is compensated at each time of scanning.

The frequency divider 32 is also initialized by the synchronizing signal from the photodetector 20; the relationship in phase between the position control clock CLK and the synchronizing signal is maintained with accuracy which is not more than one clock of the output of the oscillator 30. Because the image scanning clock is produced by the PLL from the position control clock, the phase accuracy of the position control clock and image scanning clock can be preserved at least over a period of time which is necessary for printing out one page of data. Hence, the phase accuracy of the image scanning clock and synchronizing signal can be controlled to not greater than one clock of the output of the oscillator 30 over the one-page printout time. Further, assuming that in the Eq. (1) fk is 2 MHz, N is 200, and m is 8, f needs only be on the order of 50 MHz and, therefore, the scanner can be implemented at low cost.

In an alternative embodiment of the present invention which is also applied to a laser printer, the polygon mirror 16 is provided with mirror surfaces each having a curvature, while the data stored in the ROM 44 are changed to compensate for scanning distortion of such a particular polygon mirror 16. In this construction, too, the frequency of the image scanning clock is continuously varied in proportion to the scanning speed of the laser beam. To allow a minimum of scanning distortion to occur, the above-mentioned polygon mirror 16 is constructed in such a manner as to satisfy $$\frac{A}{l_o} \leq 0.52 \left( \frac{R}{l_o} \right) \cdot \left( \frac{L_o}{l_o} \right) - 0.1708$$

where A is the radius of the osculating circle of the polygon mirror, R is the radius of curvature of the reflection surface, $L_o$ is the distance between the point of polarization and the scanning plane, and $l_o$ is the effective scanning width.

As an alternative example of the light source 12, there may be arranged a gas laser, a diaphragm lens, an optical modulator, and a converging lens. In the case of a laser display, a screen will be located in the position which in the illustrative embodiment is assumed by the drum 18.

In summary, it will be seen that the present invention provides an inexpensive and accurate optical scanner which does not rely on an fθ lens in compensating for scanning distortion and, instead, causes the frequency of an image scanning clock to vary continuously as an approximation to the scanning speed curve of a scanning spot which is developed by an optical deflector.

Various modifications will become possible for those skilled in the art after receiving the teachings of the present disclosure without departing from the scope thereof.

What is claimed is:

1. An optical scanner comprising:
    converging means for focusing a light beam issuing from a light source onto an object to be scanned as a minute spot;
    optical deflecting means interposed between said converging means and said object for deflecting the light beam to scan the object with there being no converging lens between said deflecting means and said object to be scanned; and
    frequency varying means supplied with an information signal for generating an image scanning clock in order to transfer the information signal to the light source and continuously varying frequency of the image scanning clock in proportion to a scanning speed at which the deflecting means scans the object with a scanning spot, thereby compensating for scanning distortion.

2. An optical scanner as claimed in claim 1, further comprising a first photodetector for detecting the light beam which has been deflected by the deflecting means so as to generate a synchronizing signal, the frequency varying means transferring the data signal to the light source at a timing which is controlled by the synchronizing signal.

3. An optical scanner as claimed in claim 2, further comprising a second photodetector for detecting intensity of the light beam issuing from the light source, and control means for controlling a quantity of the light beam issuing from the light source to a predetermined one in accordance with an output of said second photodetector.

4. An optical scanner as claimed in claim 1, further comprising a photodetector for detecting intensity of the light beam issuing from the light source, and control means for controlling a quantity of the light beam issuing from the light source to a predetermined one in accordance with an output of said photodetector.

5. An optical scanner as claimed in claim 1, wherein said frequency varying means comprises a frequency divider for dividing a clock oscillated by an oscillator to produce a position control clock, and a multiplier for multiplying the position control clock to produce said image scanning clock.

6. An optical scanner as claimed in claim 5, wherein said multiplier comprises a phase locked loop circuit.

* * * * *